A. ROLOW.

PLOW.

No. 10,775. Reissued Oct. 26, 1886.

Witnesses:
Solon A. Lemon
H. B. Brown

Inventor:
Artemas Rolow
By Munn & Co
Attorneys

N. PETERS, Photo-Lithographer, Washington, D. C.

UNITED STATES PATENT OFFICE.

ARTEMAS ROLOW, OF CHEROKEE, IOWA.

PLOW.

SPECIFICATION forming part of Reissued Letters Patent No. 10,775, dated October 26, 1886.

Original No. 345,992, dated July 20, 1886. Application for reissue filed August 28, 1886. Serial No. 212,124.

*To all whom it may concern:*

Be it known that I, ARTEMAS ROLOW, of Cherokee, in the county of Cherokee and State of Iowa, have invented a new and useful Improvement in Plows, of which the following is a specification.

My invention is an improvement in plows which have hinged mold-boards, which may be adjusted to spread or narrow the plow, and particularly in that class of such plows in which a lever and rack are employed for setting and securing such plow in the desired adjustment.

The invention consists in the novel construction and combinations of parts hereinafter described, whereby the rack is arranged at a suitable height and relation to the mold-board, and is at the same time braced firmly from the handles; and the invention consists in other improvements, as will be described.

Figure 1:
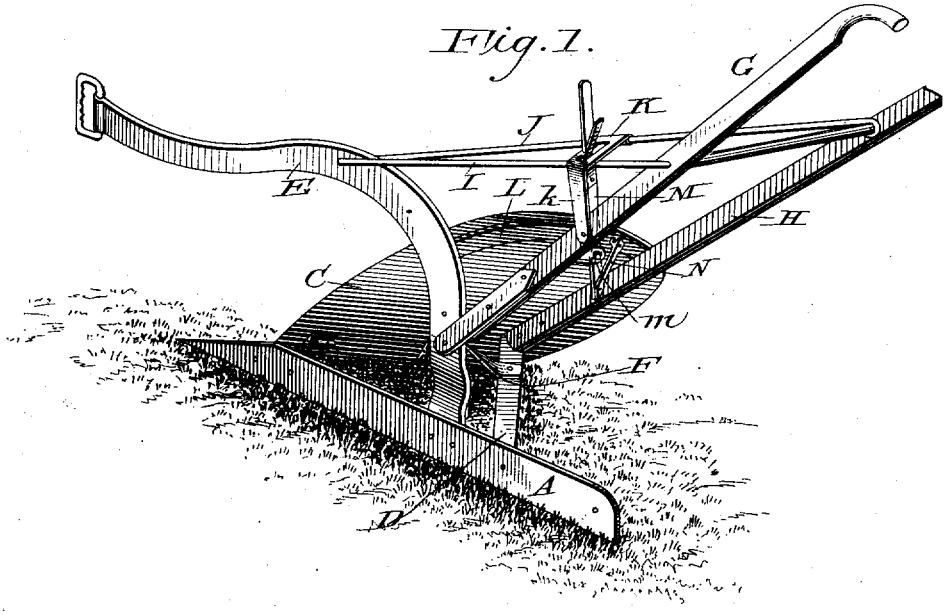
Figure 2:
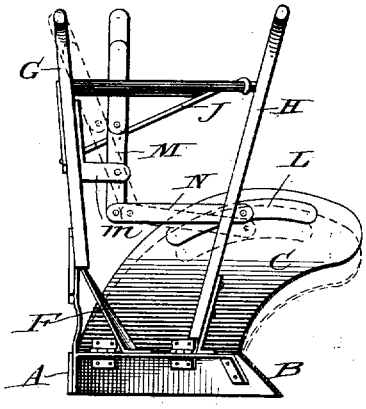

In the drawings, Figure 1 is a perspective view, and Fig. 2 a rear elevation, of a plow constructed according to my invention.

In the class of plows to which my invention particularly relates, as above specified, I have found it desirable to arrange the lever as nearly as possible to the rear end of the mold-board, in order that the adjusting-strain may be exerted transversely, or approximately so, to the direction of motion. It is also desirable to extend such lever of sufficient height to be easily grasped by the driver, and give sufficient leverage to the upper or long arm of said lever. To this end the rack K is supported on the brace-rod I, and a brace, *k*, preferably an extension of the rack K, is extended between said rod and the adjacent handle, as will be more fully described hereinafter.

The landside A and share B may be of ordinary construction. The mold-board C has at its lower edge a hinge-connection with the share, preferably effected by strap-hinges, as shown. A cross-brace, D, extends between the rear end of the share and the landside. The beam E has its rear end secured to the landside, and a strut-brace, F, extends between said beam and the brace D.

Handles G and H are, for convenience of reference, denominated, respectively, the "inner" and "outer" handles. The former is secured at its lower end to the beam, while the latter is supported on and secured to the cross-brace D. It will be noticed that the strut-brace unites with the beam and the cross-brace at the point of connection of the handles with such parts, so that such brace not only serves to brace between the beam and the share, but also operates as a brace between the lower ends of the handles. Near their upper ends the handles are connected by the usual round, and between said handles and the beam extend brace-rods I and J. To these rods is connected a rack, K, which extends between said rods, and such rack is formed with an extension, *k*, which reaches down to and is united with the inner handle. By this means the inner handle, which bears the back-pressure of the mold-board, as will be described, is braced from the rods I and J, as will be understood.

On the rear face of and transversely the mold-board, near its upper edge, I secure a crown-plate or brace-bar, L. The lever M is pivoted in a bracket, *m*, secured to the inner handle, and has its upper end arranged to engage and be held in any desired adjustment by the rack K. The lower end of this lever is connected by a link, N, with the mold-board and through the medium of the part L. As shown, the link connects with the mold-board centrally between the front and rear edges thereof, so as to effect the adjustment of said mold-board without any straining thereof resulting from unequal distribution of the pressure.

By means of the transverse bar L the mold-board is strengthened against the back-pressure of the soil, which is an important feature in adjustable mold-boards, as it is difficult to support the upper edge in such manner as to sustain this back-pressure in the different positions to which it may be adjusted; also, by connecting the link through which the mold-board is moved with the crown plate or bar, such part is caused to brace the mold-board against the forward pressure or strain of the adjusting devices, as well as against the back-pressure of the soil.

Having thus described my invention, what I claim as new is—

The combination, with the adjustable mold-board and the handles G H, the former being provided with a bracket, *m*, of the beam, the brace-rods I J, the rack K, mounted on the rods I J, provided with an extension leading to and united with handle G, the lever pivoted to bracket *m* and arranged to engage rack K, and a link connecting said lever and the mold-board, all substantially as and for the purposes specified.

ARTEMAS ROLOW.

Witnesses:
ELGIN E. LENT,
JOHN GALE.